United States Patent
Sun et al.

(10) Patent No.: US 9,635,740 B2
(45) Date of Patent: *Apr. 25, 2017

(54) SMART LIGHTING DEVICE, AND SMART LIGHTING CONTROL SYSTEM AND METHOD

(71) Applicant: SENGLED OPTOELECTRONICS CO., LTD., Tongxiang (CN)

(72) Inventors: Chaoqun Sun, Tongxiang (CN); Jinxiang Shen, Tongxiang (CN)

(73) Assignee: SENGLED OPTOELECTRONICS CO., LTD, Tongxiang (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/026,269

(22) PCT Filed: Apr. 23, 2015

(86) PCT No.: PCT/CN2015/077265
§ 371 (c)(1),
(2) Date: Mar. 31, 2016

(87) PCT Pub. No.: WO2016/045376
PCT Pub. Date: Mar. 31, 2016

(65) Prior Publication Data
US 2016/0249437 A1  Aug. 25, 2016

(30) Foreign Application Priority Data
Sep. 26, 2014  (CN) .......................... 2014 1 0502762

(51) Int. Cl.
*H05B 37/02* (2006.01)
*H05B 33/08* (2006.01)

(52) U.S. Cl.
CPC ..... *H05B 37/0236* (2013.01); *H05B 33/0842* (2013.01); *H05B 37/0227* (2013.01);
(Continued)

(58) Field of Classification Search
CPC ............ H05B 37/0236; H05B 37/0227; H05B 37/0272; H05B 37/02; H05B 37/00;
(Continued)

(56) References Cited

U.S. PATENT DOCUMENTS 6,548,967 B1 * 4/2003 Dowling ............ G06Q 30/0201
315/307
9,377,361 B2 * 6/2016 Nabata .................... G01J 5/047
(Continued)

FOREIGN PATENT DOCUMENTS

CN   103901782 A   7/2014
CN   103925548 A   7/2014
(Continued)

OTHER PUBLICATIONS

The World Intellectual Property Organization (WIPO) International Search Report for PCT/CN2015/077265 Jul. 17, 2015.

*Primary Examiner* — Haissa Philogene
(74) *Attorney, Agent, or Firm* — Anova Law Group, PLLC

(57) ABSTRACT

The present disclosure provides a smart lighting device, and a smart lighting control system and method. The smart lighting device includes a human detection module, a control module, and a microphone module. The microphone module has operation modes including a sleep mode and a monitor mode. The human detection module detects whether a human appears in a surrounding area of the smart lighting device in real-time, and sends a detection signal to the control module when a human appearance is detected. The control module receives and sends the detection signal to the microphone module to switch from a sleep mode to a monitor mode. When receiving a control signal from the control module, the microphone module switches to the monitor mode and collects audio signals in the surrounding (Continued)

area of the smart lighting device. The smart lighting device further includes a wireless communication module for wireless communication.

20 Claims, 2 Drawing Sheets

(52) U.S. Cl.
CPC .......... H05B 37/0272 (2013.01); *Y02B 20/44* (2013.01); *Y02B 20/48* (2013.01); *Y02B 60/50* (2013.01)

(58) Field of Classification Search
CPC ........ Y02B 20/40; Y02B 20/44; Y02B 20/48; Y02B 60/50; G01J 5/025
USPC ........ 315/307, 312, 318, 362, 149, 152, 158
See application file for complete search history.

(56) References Cited

U.S. PATENT DOCUMENTS

| 2013/0162146 | A1 | 6/2013 | Chang | |
|---|---|---|---|---|
| 2013/0234625 | A1 | 9/2013 | Kondo et al. | |
| 2014/0354160 | A1* | 12/2014 | Aggarwal | H05B 37/0227 |
| | | | | 315/152 |
| 2016/0105644 | A1* | 4/2016 | Smith | H04N 5/23206 |
| | | | | 348/159 |
| 2016/0227633 | A1* | 8/2016 | Sun | H05B 37/0236 |

FOREIGN PATENT DOCUMENTS

| CN | 104284485 A | 1/2015 |
|---|---|---|
| CN | 204145834 U | 2/2015 |
| JP | 2014020790 A | 2/2014 |

\* cited by examiner

SMART LIGHTING DEVICE, AND SMART LIGHTING CONTROL SYSTEM AND METHOD

CROSS-REFERENCES TO RELATED APPLICATIONS

This application is a national stage application under 35 USC §371(c) of PCT Application No. PCT/CN2015/077265, entitled "Smart Lighting Device, And Smart Lighting Control System And Method" filed on Apr. 23, 2015, which claims the priority of Chinese Patent Application No. CN201410502762.1, filed on Sep. 26, 2014. The entire disclosure and contents of the above applications are hereby incorporated by reference herein.

FIELD OF THE DISCLOSURE

The present disclosure generally relates to the field of lighting technologies and, more particularly, relates to a smart lighting device, a smart lighting control system, and a smart lighting control method.

BACKGROUND

Smart lighting devices often include a microphone unit configured to use voices to perform basic controls (such as on/off switching and brightness adjustments) of the lighting devices. However, existing smart lighting devices generally do not have wireless communication capabilities and cannot send collected audio signals to a smart terminal via Internet, which limits their applications in various situations.

On the other hand, even though some smart lighting devices may have wireless communication capabilities and voice recognition functions, the microphone may have to be operated in a monitoring mode all the time. This increases energy consumption of the device. In addition, oftentimes the collected audio signals are not useful and may occasionally cause false command recognition. Error messages and false actions may thus occur.

Therefore, it is desirable to provide a smart lighting device with a microphone having controllable operation modes so that the device could maintain a low level of energy consumption. The disclosed method, device, and system are directed to solve one or more problems set forth above and other problems in the art.

BRIEF SUMMARY OF THE DISCLOSURE

One aspect of the present disclosure provides a smart lighting device. The smart lighting device includes a light-emitting module configured to emit light, a power supply module configured to power an entire smart lighting device, a human detection module, a control module, and a microphone module. The human detection module is configured to detect whether a human appears in a surrounding area of the smart lighting device in real-time, and to send a detection signal to the control module when a human appearance is detected. The control module is configured to receive the detection signal from the human detection module to provide a control signal based on the detection signal, and to send the control signal to the microphone module to switch the microphone module from a sleep mode to a monitor mode. The microphone module is configured to receive the control signal from the control module and to collect audio signals in the surrounding area of the smart lighting device at the monitor mode.

Another aspect of the present disclosure provides a smart lighting control system including a cloud server and a smart lighting device. The smart lighting device includes a light-emitting module configured to emit light, a power supply module configured to power an entire smart lighting device, a wireless communication module, a human detection module, a control module, and a microphone module. The human detection module is configured to detect whether a human appears in a surrounding area of the smart lighting device in real-time, and to send a detection signal to the control module when a human appearance is detected. The control module is configured to receive the detection signal from the human detection module to provide a control signal based on the detection signal, and to send the control signal to the microphone module to switch the microphone module from a sleep mode to a monitor mode. The microphone module is configured to receive the control signal from the control module and to collect audio signals in the surrounding area of the smart lighting device at the monitor mode. The wireless communication module is configured to perform wireless communications with the cloud server and an external device, and to send the audio signals from the microphone module to the cloud server. The cloud server is configured to perform a voice recognition on the audio signals using a recognition software, and when a voice command is recognized from the audio signals, to send the voice command to the smart lighting device for controlling the light-emitting module to adjust the emitted light according to the voice command.

Another aspect of the present disclosure provides a smart lighting control method using a smart lighting device. The smart lighting device includes a power supply module, a light-emitting module, a human detection module, a microphone module configured to have operation modes including a sleep mode and a monitor mode, a wireless communication module, and a control module. The human detection module detects a human appearance in a surrounding area of the smart lighting device to provide a detection signal to send to the control module. The control module provides a control signal based on the detection signal and send the control signal to the microphone module to switch the microphone module to the monitor mode. The microphone module at the monitor mode collects audio signals in the surrounding area of the smart lighting device. The audio signals are recognized by the control module of the smart lighting device locally or by a cloud server connected to the smart lighting device to generate a voice command. An on/off switch, brightness, color, color temperature, or their combinations of light emitted from the light-emitting module are adjusted according to the voice command.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, one of ordinary skill in the art may derive other embodiments consistent with the present disclosure, all of which are within the scope of the present invention.

Figure 1:
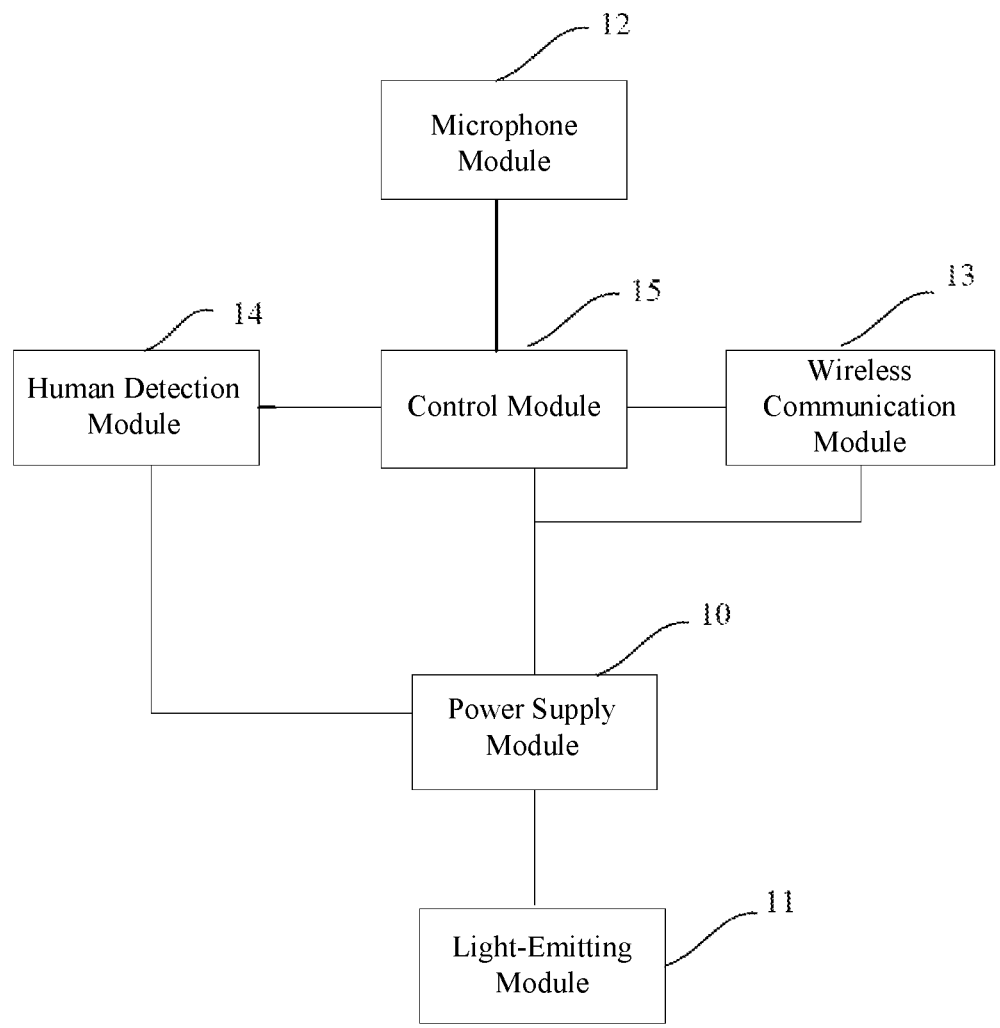
FIG. 1 is a schematic structure diagram of an exemplary smart lighting device consistent with various disclosed embodiments of the present disclosure.

FIG. 1 is a schematic structure diagram of an exemplary smart lighting device consistent with various disclosed embodiments of the present disclosure. An exemplary smart lighting device may be a smart LED lighting device. As shown in FIG. 1, an exemplary smart lighting device may include a power supply module 10, a light-emitting module 11, a microphone module 12, a control module 15, a wireless communication module 13 and a human detection module 14.

The power supply module 10 may provide power to the entire smart lighting device, and drive the light-emitting module 11 to emit light. The microphone module 12, the control module 15, the wireless communication module 13 and the human detection module 14 may respectively connect to the power supply module 10. The microphone module 12 may be configured to have controllable or switchable operation modes, for example, including a sleep mode and a monitor mode.

As disclosed herein, the human detection module 14 may be configured to sense and detect whether a human (and/or sometimes an animal) appears in a surrounding area of the smart lighting device in real-time. When a human appearance is detected, the human detection module 14 is configured to send a feedback signal to the control module 15.

The control module 15 may be configured to receive the feedback signal from the human detection module 14, and send a control signal to the microphone module 12 to activate the microphone module 12 from the sleep mode to the monitor mode. When operating at a monitor mode, the microphone module 12 may be configured to collect audio signals near the smart lighting device, and to send the audio signals to the control module 15 and the wireless communication module 13.

In one embodiment, the microphone module 12 may switch between the sleep mode and the monitor mode by a built-in software program configured in the smart lighting device such as a smart LED lighting device. For example, the built-in software program may be integrated and loaded into the control module 15 within the smart LED lighting device. In another embodiment, switching between the sleep mode and the monitor mode may be implemented by hardware such as an integrated circuit (IC) device.

Further, in various embodiments, the human detection module 14 operates in real-time. When a human (and/or an animal) near the smart lighting device left or disappeared or outside of the detection area of the human detection module 14, the control module 15 will not receive the feedback signal from the human detection module 14, for example, within a preset time duration, such as about 10 seconds or any preset time duration, the control module 15 may send a control signal to switch the microphone module 12 to the sleep mode. In certain embodiments, a human near the smart lighting device may use a specific hand gesture or a voice command to switch the microphone module 12 to the sleep mode.

In one embodiment, the microphone module 12 may be automatically activated to be in the monitor mode when the human detection module 14 senses a human appearance. In another embodiment, the microphone module 12 may be activated to be in the monitor mode when the human detection module 14 senses a preset human gesture or a preset human action. For example, the preset human gesture may be a body action in a pre-configured pattern, such as waving a hand clockwise for more than 90 degrees, and/or moving a hand, an elbow or a head from a distance towards the smart lighting device.

In various embodiments, the human detection module 14 may include a sensor or multiple sensors to detect a human appearance. For example, the human detection module 14 may include an infrared sensor, a microwave radar sensor, an ultrasound sensor, a near-field capacitive sensor, etc., or a combination thereof.

Further, the smart lighting device may include a microphone activation indicator to indicate whether the microphone is being operated at the monitor mode or not.

Figure 2:
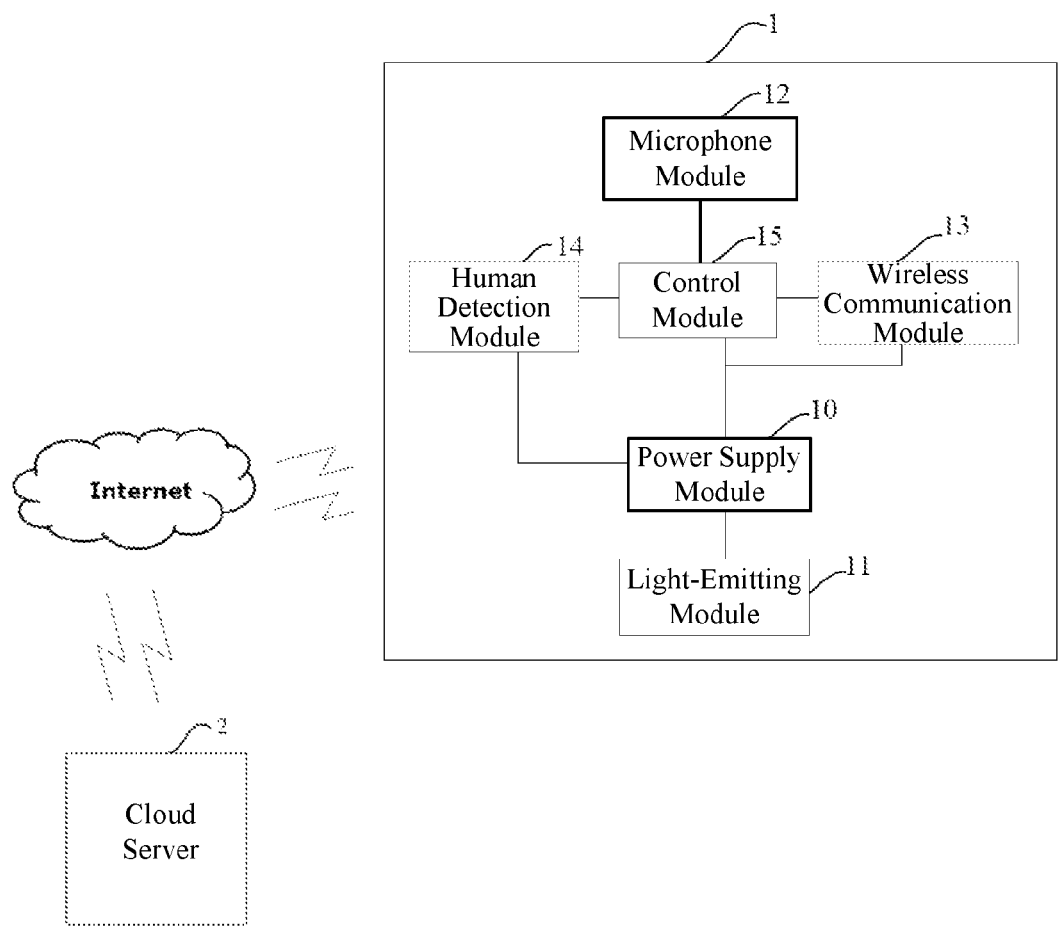
FIG. 2 is a schematic diagram of an exemplary application scenario of the smart lighting device consistent with various disclosed embodiments of the present disclosure.

FIG. 2 is a schematic diagram of an exemplary application scenario of the smart lighting device consistent with various embodiments of the present disclosure. As shown in FIG. 2, an exemplary smart lighting device 1 may connect to a cloud server 2 via a network. The smart lighting device 1 and the cloud server 2 may form a smart lighting control system. Note that the cloud server is used herein as an example for illustration purposes, any computing devices, such as a smart terminal, can be used to replace the cloud server.

When the human detection module 14 of the smart lighting device 1 detects a human/animal appearance in a surrounding area of the smart lighting device 1, the microphone module 12 may be activated to be at the monitor mode and start to collect audio signals surrounding the smart lighting device 1.

In one embodiment, the control module 15 of the smart lighting device 1 may perform voice recognition on the collected audio signals. In another embodiment, the cloud server 2 may use a software program to implement voice recognition on the collected audio signals. After voice recognition, a voice command may be recognized. The control module 15 may process the voice command and adjust the brightness, color, color temperature, and/or on and off switch of the smart lighting device 1 according to the voice command.

In one embodiment, the control module 15 of the smart lighting device 1 may perform voice recognition on the collected audio signals. In another embodiment, the voice recognition may be implemented by a software program configured on the cloud server 2.

After a voice command is recognized from the audio signals by the voice recognition using the cloud server 2 or the control module 15 of the smart lighting device 1, the voice command may be converted (or otherwise be processed) by the control module 15 to adjust the on/off switch, orientation, brightness, color, and/or color temperature of the smart lighting device 1 according to the voice command.

In various embodiments, the audio signals collected by the microphone module 12 may include any audio information such as a voice command, noises, and/or music sound from a human, an animal or any suitable objects. Accordingly, such audio signals may be recognized by either the control module 15 or the cloud server 2. When the audio signals are recognized to generate a voice command by the voice recognition, the voice command is further processed by the control module 15 to control and/or adjust the smart lighting device 1, e.g., to turn on/off and/or to adjust light emitted by another smart lighting device in a different room, to turn on/off or adjust volume of a speaker of any smart lighting device in the same device network, etc.

In certain embodiments, a device network may be formed to include multiple smart lighting devices and one or more computing devices such as a server and/or a smart terminal. For example, a human approaching one of the smart lighting devices may be detected by the human detection module of one smart lighting device in the device network to turn on its microphone to collect audio signals of the human. The voice command generated by a cloud server from the collected audio signals may then be used to control other different smart lighting devices in a same network through the cloud server. For example, the software program configured on the cloud server may generate voice commands with respect to each of various different smart lighting devices and to allow centralized control of these smart lighting devices in the same network. In this case, audio signal collected by one smart lighting device may be used to control other smart lighting device(s) via the cloud server.

In other certain embodiments, a device network may be formed to include multiple smart lighting devices, which may not include a server (such as a cloud server) or a smart terminal. For example, a human approaching one of the smart lighting devices may provide an audio signal recognized by the control module of the smart lighting device to provide a voice command to control other different smart lighting device(s), e.g., to turn on/off and/or to adjust light emitted by another smart lighting device in a different room, to turn on/off or adjust volume of a speaker of any smart lighting device in the same device network, etc.

In addition, the smart lighting device 1 may connect to the Internet, and a user may directly inquire online information by voice commands, such as inquiring weather information and traffic information. In one embodiment, the smart lighting device 1 may further include a built-in speaker or a wireless speaker configured to broadcast the inquired information. In another embodiment, the inquired information may be broadcasted by an external speaker in the same network. In various embodiments, the broadcasted information may be received and implemented by any desired smart lighting device(s) in a device network.

Further, the built-in speaker in one smart lighting device or the external speaker in a same network may broadcast feedback information according to the voice command and allow interactions between a human (e.g., a user) and the smart lighting device. For example, the feedback information may confirm the user's lighting control commands, such as confirming turning light off right away or after a certain period of time, changing light color to blue or other color, increasing/decreasing brightness, etc. In another example, the feedback information may request the user's further guidance or detailed instructions in various occasions, such as asking the time and location for the weather report, and/or asking a specific road name for the traffic information.

The wireless communication module 13 may be configured to perform wireless communication with the cloud server and/or other devices. In various embodiments, the wireless communication module 13 may be a radio frequency (RF) module, a WI-FI module, or a Bluetooth module.

In one embodiment, the wireless communication module 13 may be a radio frequency module which adopts 2.4 G or 5 G WI-FI technologies, or adopts 2.5 G, 3 G or 4 G mobile wireless communication technologies.

The present disclosure also provides a smart lighting method using a smart lighting device. The smart lighting device may include a power supply module, a light-emitting module, a human detection module, a microphone module, a wireless communication module and a control module. An exemplary smart lighting method consistent with the present disclosure may include the following exemplary steps.

In step 1, the human detection module may detect whether a human appears in a surrounding area of the smart lighting device. When detecting a human appearance, the human detection module sends a detection signal to the control module, such that the control module may control the microphone to switch from a sleep mode to a monitor mode.

In step 2, the microphone module operates at the monitor mode and collects audio signals in the surrounding area of the smart lighting device.

In step 3, the audio signals may be parsed by the smart lighting device locally or by a cloud server connected to the smart lighting device.

In step 4, when the audio signals are recognized to generate a voice command, the voice command may be processed by the control module of the smart lighting device to adjust the on/off switch, orientation, brightness, color, and/or color temperature of the light emitted by the smart lighting device according to the voice command. Other smart lighting devices in a same network may be controlled according to the voice command through the cloud server (or other computing device).

In one embodiment, in step 1, the microphone module may be automatically switched to the monitor mode when the human detection module senses and detects a human appearance. In another embodiment, the microphone module may switch to the monitor mode when the human detection module senses a preset human gesture or a preset human action. For example, the preset gesture may be a body action in a pre-configured pattern, such as waving a hand clockwise for more than 90 degrees, and/or moving a hand, an elbow or a head from a distance towards the smart lighting device.

In certain embodiments, in addition to detection of human appearance (e.g., detection of a human body) performed by the human detection module, the control module, and/or the cloud server, face recognition technologies may be applied to detect the appearance of specific human(s) according to a pre-stored face library. In this case, an image acquisition module may be included in the smart lighting device to acquire face information of a human/user being detected. A user may store his/her face credentials in the face library together with preset configurations, such as preferences on orientation, brightness, color, and/or color temperature of the light, and/or a preset voice command to activate the preset configuration. When the face recognition program determines that the user appears and/or the user gives the preset voice command, the smart lighting device may adjust the light-emitting module accordingly, for example, by changing color/brightness of the emitted light and/or broadcasting certain information from the speaker.

In some embodiments, the control module may adjust the lighting of the light emitting module based on whether the motion/action of the detected human (or animal) provides accurate commands. For example, if the smart lighting device detects human gestures that are similar or close to the human gestures defined for certain control commands (e.g., switching light on, switching light off, etc.) but the control system cannot clearly identify the gestures from the detection signal, the smart lighting device's control module may make adjustment(s) to the human detection module for better detection. For example, the smart lighting device may be controlled to adjust detection area of the human detection module (e.g., by micro-rotating the human detection module) to better match the position of the user. In the meantime, the lighting of the smart lighting device may also be adjusted to let the user observe the change and to re-make a gesture to trigger a control command (e.g., to turn on the microphone).

Similarly, if the smart lighting device has difficulty performing certain functions such as face recognition functions using an additional image acquisition module to trigger the microphone module to switch on/off or change operational modes, the smart lighting device's control module may make adjustment(s) to the lighting generated by the light emitting module. For example, the smart lighting device may adjust the orientation, brightness, color, etc., of the light so that the image acquisition module may acquire images of better quality.

In some embodiments, the smart lighting device may control the light emitting module 11 to show light signals indicative of the operations of the human detection module 14 or the microphone module 12. The light signals may be generated by a primary lighting module or a secondary lighting module. For example, when the human detection module 14 detects the appearance of a person, the smart lighting device may turn on a secondary lighting module, which may be a low power indicator light, for a short time (e.g., 5 seconds) to indicate that the smart lighting device has detected a human appearance. In another example, when the human detection module 14 detects the appearance of a person, the smart lighting device may trigger a flash using the primary lighting module. Further, when the microphone module 12 is waken up from the Sleep state or receives a valid voice command, the smart lighting device may turn on or change the lighting of the primary lighting module or the secondary lighting module to indicate the operations of the microphone module 12.

Further, the smart lighting device may connect to the Internet through the wireless communication module. A human/user may directly inquire online information by voice commands. The voice commands may be recognized from the audio signals collected by the microphone module.

Optionally, the smart lighting device may further include a built-in speaker configured to broadcast the inquired information. In another example, the inquired information may be broadcasted by an external speaker in the same network as the smart lighting device.

In one embodiment, the smart lighting method may further include the following exemplary step. The human detection module monitors the surrounding area of the smart lighting device. When detecting a human or an animal near the smart lighting device is disappeared for a preset time duration (e.g., about 10 minutes), the human detection module sends a feedback signal to the control module to switch the microphone module to the sleep mode.

In another embodiment, a human or user near the smart lighting device may use a specific gesture or a voice command to switch the microphone module to the sleep mode. The specific gesture may be a body action in a pre-configured pattern, such as waving a hand clockwise for more than 90 degrees, and/or moving a hand, an elbow or a head from a distance toward the smart lighting device.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The present disclosure provides a smart lighting device with a built-in microphone module and a human detection module. The microphone module may have two operation modes including a sleep mode and a monitor mode. When the human detection module detects human appearance in a surrounding area of the smart lighting device, the microphone module may be waked up to be operated at the monitor mode. Therefore, the microphone module may collect audio signals at the monitor mode when needed, and maintain low power consumption at the sleep mode when not needed. This reduces power consumption of the entire smart lighting device, saves power, and expands the operational duration of the smart lighting device.

Further, the microphone module may send collected audio signals through the wireless communication module to a cloud server/smart terminal, which enables intelligent monitoring. In addition, the smart lighting device and the cloud server/smart terminal may perform voice recognition on the audio signals. When a voice command is recognized and generated from the audio signals, the light-emitting module may be controlled adjust the on/off switch, orientation, brightness, color, and/or color temperature of the smart lighting device according to the voice command. In certain embodiments, the voice command may include controlling other smart devices in a same network through the cloud server or one of the smart lighting devices in a device network.

What is claimed is:

1. A smart lighting device, comprising:
   a light-emitting module configured to emit light;
   a power supply module configured to power an entire smart lighting device;
   a human detection module;
   a control module; and
   a microphone module,
   wherein:
   the human detection module is configured to detect whether a human appears in a surrounding area of the smart lighting device in real-time, and to send a detection signal to the control module when a human appearance is detected;
   the control module is configured to receive the detection signal from the human detection module to provide a control signal based on the detection signal, and to send the control signal to the microphone module to switch the microphone module from a sleep mode to a monitor mode; and
   the microphone module is configured to receive the control signal from the control module and to collect audio signals in the surrounding area of the smart lighting device at the monitor mode.

2. The smart lighting device according to claim 1, wherein the control module is further configured to perform a voice recognition on the audio signals from the microphone module to generate a voice command to control the light-emitting module to adjust an emitted light according to the voice command.

3. The smart lighting device according to claim 2, wherein:
the emitted light is adjusted according to the voice command by adjusting an orientation, brightness, color, color temperature, or on and off switch of the smart lighting device.

4. The smart lighting device according to claim 1, further comprising: a microphone activation indicator configured to indicate whether the microphone module is triggered to be at the monitor mode.

5. The smart lighting device according to claim 1, wherein:
the human detection module is configured to automatically send the detection signal to the control module to switch the microphone module to the monitor mode, when the human detection module detects the human appearance.

6. The smart lighting device according to claim 1, wherein:
the human detection module is configured to send the detection signal to the control module to switch the microphone module to the monitor mode, when the human detection module detects an appearance of a specific human gesture.

7. The smart lighting device according to claim 1, wherein:
the human detection module is an infrared (IR) sensor, a microwave radar sensor, an ultrasound sensor, a near-field capacitive sensor, or a combination thereof.

8. A smart lighting control system, comprising:
a cloud server; and
a smart lighting device including:
a light-emitting module configured to emit light,
a power supply module configured to power an entire smart lighting device,
a wireless communication module,
a human detection module,
a control module, and
a microphone module,
wherein:
the human detection module is configured to detect whether a human appears in a surrounding area of the smart lighting device in real-time, and to send a detection signal to the control module when a human appearance is detected,
the control module is configured to receive the detection signal from the human detection module to provide a control signal based on the detection signal, and to send the control signal to the microphone module to switch the microphone module from a sleep mode to a monitor mode,
the microphone module is configured to receive the control signal from the control module and to collect audio signals in the surrounding area of the smart lighting device at the monitor mode,
the wireless communication module is configured to perform wireless communications with the cloud server, and to send the audio signals from the microphone module to the cloud server, and
the cloud server is configured to perform voice recognition on the audio signals using a recognition software, and when a voice command is recognized from the audio signals, to send the voice command to the smart lighting device for controlling the light-emitting module to adjust the emitted light according to the voice command.

9. The smart lighting control system according to claim 8, wherein:
the human detection module is an infrared (IR) sensor, a microwave radar sensor, an ultrasound sensor, a near-field capacitive sensor, or a combination thereof.

10. The smart lighting control system according to claim 8, wherein:
the wireless communication module is a radio frequency (RF) module, a WI-FI module or a Bluetooth module; and
when the wireless communication module is the RF module, the wireless communication module is configured to adopt 2.5G, 3G or 4G mobile wireless communication.

11. The smart lighting control system according to claim 8, wherein:
the control module is configured to respectively connect the light-emitting module, the human detection module, the microphone module, and the wireless communication module.

12. A smart lighting control method, comprising:
providing a smart lighting device including a power supply module, a light-emitting module, a human detection module, a microphone module configured to have operation modes including a sleep mode and a monitor mode, a wireless communication module, and a control module;
detecting, by the human detection module, a human appearance in a surrounding area of the smart lighting device to provide a detection signal to send to the control module;
providing, by the control module, a control signal based on the detection signal and send the control signal to the microphone module to switch the microphone module to the monitor mode;
collecting, by the microphone module at the monitor mode, audio signals in the surrounding area of the smart lighting device;
recognizing, by the control module of the smart lighting device locally or by a cloud server connected to the smart lighting device, the audio signals to generate a voice command; and
adjusting an on/off switch, brightness, color, color temperature, or their combinations of light emitted from the light-emitting module according to the voice command.

13. The method according to claim 12, further comprising:
configuring one or more smart lighting devices in a same network, and
controlling a second smart lighting device by the voice command through the cloud server connected to the smart lighting device.

14. The method according to claim 12, wherein:
automatically sending, by the human detection module, the detection signal to the control module to switch the microphone module to the monitor mode, when the human detection module detects the human appearance.

15. The method according to claim 12, wherein:
sending, by the human detection module, the detection signal to the control module to switch the microphone module to the monitor mode, when the human detection module detects an appearance of a specific human gesture.

16. The method according to claim 12, further comprising:
connecting the smart lighting device to the Internet through the wireless communication module, and
inquiring online information according to the voice command by the microphone module, wherein the online information is weather information or traffic information.

17. The method according to claim 16, further comprising:
providing a built-in speaker in the smart lighting device, and
broadcasting the online information by the built-in speaker.

18. The method according to claim 16, further comprising:
connecting an external speaker to a network including one or more smart lighting device, and
broadcasting the online information by the external speaker.

19. The method according to claim 16, further comprising:
sending, by the control module, another control signal to switch the microphone module to the sleep mode, when the control module does not receive a feedback signal from the human detection module for a preset time duration.

20. The method according to claim 16, further comprising:
switching the microphone module to the sleep mode when a human near the smart lighting device performs a specific gesture or a voice command.

* * * * *